(12) United States Patent
Koskulics

(10) Patent No.: US 11,634,942 B2
(45) Date of Patent: Apr. 25, 2023

(54) ELECTRIC POTENTIALLY-DRIVEN SHADE WITH ELECTROSTATIC SHADE RETRACTION, AND/OR ASSOCIATED METHODS

(71) Applicant: GUARDIAN GLASS, LLC, Auburn Hills, MI (US)

(72) Inventor: Jeffrey Koskulics, Auburn Hills, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 175 days.

(21) Appl. No.: 16/779,927

(22) Filed: Feb. 3, 2020

(65) Prior Publication Data

US 2021/0238913 A1 Aug. 5, 2021

(51) Int. Cl.
*E06B 3/67* (2006.01)
*E06B 9/42* (2006.01)
*E06B 9/24* (2006.01)

(52) U.S. Cl.
CPC .............. *E06B 3/6722* (2013.01); *E06B 9/42* (2013.01); *E06B 2009/2447* (2013.01)

(58) Field of Classification Search
CPC ... E06B 9/42; E06B 3/6722; E06B 2009/2447
USPC .......................................................... 160/90
See application file for complete search history.

(56) References Cited

U.S. PATENT DOCUMENTS

| | | |
|---|---|---|
| 3,236,290 A | 2/1966 | Lueder |
| 3,897,997 A | 8/1975 | Kalt |
| 3,989,357 A | 11/1976 | Kalt |
| 4,094,590 A | 6/1978 | Kalt |
| 4,105,294 A | 8/1978 | Peck |
| 4,208,103 A | 6/1980 | Kalt et al. |
| 4,248,501 A | 2/1981 | Simpson |
| 4,266,339 A | 5/1981 | Kalt |
| 4,336,536 A | 6/1982 | Kalt et al. |
| 4,383,255 A | 5/1983 | Grandjean et al. |
| 4,468,663 A | 8/1984 | Kalt |

(Continued)

FOREIGN PATENT DOCUMENTS

| | | |
|---|---|---|
| EP | 1241507 | 5/2005 |
| JP | 2005-089643 | 4/1995 |

(Continued)

OTHER PUBLICATIONS

U.S. Appl. No. 16/779,990, filed Feb. 3, 2020; Yabei Gu.

(Continued)

*Primary Examiner* — Beth A Stephan

(57) ABSTRACT

Certain example embodiments relate to electric, potentially-driven shades usable with insulating glass (IG) units, IG units including such shades, and/or associated methods. In such a unit, a dynamic shade is located between the substrates defining the IG unit, and is movable between retracted and extended positions. The dynamic shade includes on-glass layers including a transparent conductor and an insulator or dielectric film, as well as a shutter. The shutter includes alternating conductive and dielectric layers, supported by one or more resilient polymer-based layers. A first set of electrostatic forces help cause the shutter to extend and remain in an extended position, whereas an electric field can be setup to help encourage the retraction of the shutter from an extended or at least partially extended position.

31 Claims, 5 Drawing Sheets

(56) References Cited

U.S. PATENT DOCUMENTS

| | | |
|---|---|---|
| 4,488,784 A | 12/1984 | Kalt et al. |
| 4,695,837 A | 9/1987 | Kalt |
| 4,747,670 A | 5/1988 | Devio et al. |
| 4,788,089 A | 11/1988 | Skipper |
| 4,915,486 A | 4/1990 | Hansen |
| 4,978,952 A | 12/1990 | Irwin |
| 5,231,559 A | 7/1993 | Kalt et al. |
| 5,519,565 A | 5/1996 | Kalt et al. |
| 5,554,434 A | 9/1996 | Park et al. |
| 5,629,790 A | 5/1997 | Neukermans et al. |
| 5,638,084 A | 6/1997 | Kalt |
| 6,057,814 A | 5/2000 | Kalt |
| 6,075,639 A | 6/2000 | Kino et al. |
| 6,081,304 A | 6/2000 | Kuriyama et al. |
| 6,229,509 B1 | 5/2001 | DeLuca et al. |
| 6,317,108 B1 | 11/2001 | Kalt |
| 6,557,279 B2 | 5/2003 | Araki et al. |
| 6,692,646 B2 | 2/2004 | Kalt et al. |
| 6,771,237 B1 | 8/2004 | Kalt |
| 6,887,575 B2 | 5/2005 | Neuman et al. |
| 6,897,786 B1 | 5/2005 | Kalt |
| 6,972,888 B2 | 12/2005 | Poll et al. |
| 7,056,588 B2 | 6/2006 | Neuman et al. |
| 7,085,609 B2 | 8/2006 | Bechtel et al. |
| 7,189,458 B2 | 3/2007 | Ferreira et al. |
| 7,198,851 B2 | 4/2007 | Lemmer et al. |
| 7,645,977 B2 | 1/2010 | Schlam et al. |
| 7,705,826 B2 | 4/2010 | Kalt et al. |
| 7,771,830 B2 | 8/2010 | Neuman et al. |
| 7,998,320 B2 | 8/2011 | Laird et al. |
| 8,035,075 B2 | 10/2011 | Schlam et al. |
| 8,134,112 B2 | 3/2012 | Schlam et al. |
| 8,557,391 B2 | 10/2013 | Frank et al. |
| 8,668,990 B2 | 3/2014 | Broadway et al. |
| 8,736,938 B1 | 5/2014 | Schlam et al. |
| 8,925,286 B2 | 1/2015 | Hagen et al. |
| 8,982,441 B2 | 3/2015 | Schlam et al. |
| 9,229,291 B2 | 1/2016 | Kailasam et al. |
| 9,556,066 B2 | 1/2017 | Frank et al. |
| 9,670,092 B2 | 6/2017 | Lemmer et al. |
| 9,695,085 B2 | 7/2017 | Lemmer et al. |
| 9,796,619 B2 | 10/2017 | Broadway et al. |
| 9,802,860 B2 | 10/2017 | Frank et al. |
| 10,162,240 B2 | 12/2018 | Rozbicki |
| 10,288,969 B2 | 5/2019 | Kailasam et al. |
| 10,788,723 B2 | 9/2020 | Rozbicki et al. |
| 10,801,258 B2 | 10/2020 | Krasnov et al. |
| 10,831,077 B2 | 11/2020 | Kailasam et al. |
| 10,871,027 B2 | 12/2020 | Petrmichl et al. |
| 10,876,349 B2 | 12/2020 | Blush et al. |
| 10,895,102 B2 | 1/2021 | Frey et al. |
| 10,914,114 B2 | 2/2021 | Blush et al. |
| 10,927,592 B2 | 2/2021 | Blush et al. |
| 11,174,676 B2 | 11/2021 | Gu |
| 2002/0144831 A1 | 10/2002 | Kalt |
| 2010/0172007 A1 | 7/2010 | Schlam et al. |
| 2013/0188235 A1 | 7/2013 | Floyd |
| 2014/0272314 A1 | 9/2014 | Veerasamy |
| 2014/0338846 A1 | 11/2014 | Hikmet et al. |
| 2017/0184221 A1 | 6/2017 | Mcnamara et al. |
| 2019/0366679 A1 | 12/2019 | Madsen et al. |
| 2021/0254397 A1 | 8/2021 | Gu et al. |

FOREIGN PATENT DOCUMENTS

| | | |
|---|---|---|
| JP | 10-249278 | 9/1998 |
| KR | 10-2009-0008928 | 1/2009 |
| KR | 10-2013-0011845 | 1/2013 |
| WO | 2020008434 A1 | 1/2020 |
| WO | 2020008438 A1 | 1/2020 |

OTHER PUBLICATIONS

U.S. Appl. No. 16/792,348, filed Feb. 17, 2020; Yabei Gu et al.
U.S. Appl. No. 16/947,014, filed Jul. 15, 2020, 38 Pages.
International Search Report and Written Opinion received for PCT Application No. PCT/IB2021/050870, dated May 19, 2021, 10 Pages.
International Search Report and Written Opinion received for PCT Application No. PCT/IB2021/062199, dated Apr. 20, 2022, 12 Pages.
"Linear Technology—Photoflash Capacitor Chargers L T3484-0/L T3484—1 IL T3484-2", retrieved from Internet URL: https://www.analog.com/media/en/technical-documentation/data-sheets/3484012f.pdf, retrieved on Jun. 10, 2020, 12 pages.
International Search Report and Written Opinion received for PCT Application No. PCT/IB2021/050867, dated May 21, 2021, 10 Pages.
International Search Report and Written Opinion received for PCT Application No. PCT/IB2021/051326, dated May 27, 2021, 12 pages.
International Search Report and Written Opinion received for PCT Application No. PCT/IB2021/056376, dated Nov. 8, 2021, 10 Pages.

ELECTRIC POTENTIALLY-DRIVEN SHADE WITH ELECTROSTATIC SHADE RETRACTION, AND/OR ASSOCIATED METHODS

TECHNICAL FIELD

Certain example embodiments of this invention relate to shades that may be used with insulating glass units (IG units or IGUs), IG units including such shades, and/or methods of making the same. More particularly, certain example embodiments of this invention relate to electric, potentially-driven shades that may be used with IG units, IG units including such shades, and/or methods of making the same.

BACKGROUND AND SUMMARY

The building sector is known for its high energy consumption, which has been shown to represent 30-40% of the world's primary energy expenditure. Operational costs, such as heating, cooling, ventilation, and lighting account for the better part of this consumption, especially in older structures built under less stringent energy efficiency construction standards.

Windows, for example, provide natural light, fresh air, access, and connection to the outside world. However, they oftentimes also represent a significant source of wasted energy. With the growing trend in increasing the use of architectural windows, balancing the conflicting interests of energy efficiency and human comfort is becoming more and more important. Furthermore, concerns with global warming and carbon footprints are adding to the impetus for novel energy efficient glazing systems.

In this regard, because windows are usually the "weak link" in a building's isolation, and considering modern architectural designs that often include whole glass facades, it becomes apparent that having better insulating windows would be advantageous in terms of controlling and reducing energy waste. There are, therefore, significant advantages both environmentally and economically in developing highly insulating windows.

Insulating glass units (IG units or IGUs) have been developed and provide improved insulation to buildings and other structures, and FIG. 1 is a cross-sectional, schematic view of an example IG unit. In the FIG. 1 example IG unit, first and second substrates 102 and 104 are substantially parallel and spaced apart from one another. A spacer system 106 is provided at the periphery of the first and second substrates 102 and 104, helping to maintain them in substantially parallel spaced apart relation to one another and helping to define a gap or space 108 therebetween. The gap 108 may be at least partially filled with an inert gas (such as, for example, Ar, Kr, Xe, and/or the like) in some instances, e.g., to improve the insulating properties of the overall IG unit. Optional outer seals may be provided in addition to the spacer system 106 in some instances.

Windows are unique elements in most buildings in that they have the ability to "supply" energy to the building in the form of winter solar gain and daylight year around. Current window technology, however, often leads to excessive heating costs in winter, excessive cooling in summer, and often fails to capture the benefits of daylight, that would allow lights to be dimmed or turned off in much of the nation's commercial stock.

Thin film technology is one promising way of improving window performance. Thin films can, for example, be applied directly onto glass during production, on a polymer web that can be retrofitted to an already pre-existing window at correspondingly lower cost, etc. And advances have been made over the last two decades, primarily in reducing the U-value of windows through the use of static or "passive" low-emissivity (low-E) coatings, and by reducing the solar heat gain coefficient (SHGC) via the use of spectrally selective low-E coatings. Low-E coatings may, for example, be used in connection with IG units such as, for example, those shown in and described in connection with FIG. 1. However, further enhancements are still possible.

For instance, it will be appreciated that it would be desirable to provide a more dynamic IG unit option that takes into account the desire to provide improved insulation to buildings and the like, takes advantage of the ability of the sun to "supply" energy to its interior, and that also provides privacy in a more "on demand" manner. It will be appreciated that it would be desirable for such products to have a pleasing aesthetic appearance, as well.

Certain example embodiments address these and/or other concerns. For instance, certain example embodiments of this invention relate to electric, potentially-driven shades that may be used with IG units, IG units including such shades, and/or methods of making the same.

In certain example embodiments, an insulating glass (IG) unit is provided. First and second substrates each have interior and exterior major surfaces, with the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates, the shade including: a first conductive layer provided, directly or indirectly, on the interior major surface of the first substrate; and a shutter including at least one polymer substrate, first and second conductive coatings, and first and second dielectric layers, wherein the at least one polymer substrate is extendible to a shutter closed position and retractable to a shutter open position. The first and/or second conductive coatings are electrically connectable to a power source that is controllable to set up (a) a first electric potential difference to create first electrostatic forces to drive the at least one polymer substrate to the shutter closed position, and (b) a second electric potential difference to create second electrostatic forces to encourage the at least one polymer substrate to at least partially retract.

In certain example embodiments, there is provided a substrate, comprising a dynamically controllable shade provided thereon. The shade includes: a first conductive layer provided, directly or indirectly, on a major surface of the substrate; and a shutter including at least one polymer substrate, first and second conductive coatings, and first and second dielectric layers, wherein the at least one polymer substrate is extendible to a shutter closed position and retractable to a shutter open position. The first and/or second conductive coatings are electrically connectable to a power source that is controllable to set up (a) a first electric potential difference to create first electrostatic forces to drive the at least one polymer substrate to the shutter closed position, and (b) a second electric potential difference to create second electrostatic forces to encourage the at least one polymer substrate to at least partially retract.

In certain example embodiments, a method of making an insulating glass (IG) unit is provided. The method includes having first and second substrates, each having interior and exterior major surfaces, the interior major surface of the first substrate facing the interior major surface of the second substrate. A dynamically controllable shade is provided on the first and/or second substrate, the shade including: a first conductive layer provided, directly or indirectly, on the interior major surface of the first substrate; and a shutter including at least one polymer substrate, first and second conductive coatings, and first and second dielectric layers, wherein the at least one polymer substrate is extendible to a shutter closed position and retractable to a shutter open position. The first and second substrates are connected to one another in substantially parallel, spaced apart relation, such that a gap is defined therebetween and such that the dynamically controllable shade is located in the gap. The first and/or second conductive coatings are electrically connectable to a power source that is controllable to set up (a) a first electric potential difference to create first electrostatic forces to drive the at least one polymer substrate to the shutter closed position, and (b) a second electric potential difference to create second electrostatic forces to encourage the at least one polymer substrate to at least partially retract.

According to certain example embodiments, the first conductive layer and the first and second conductive coatings collectively form first and second conductor pairs, the first conductor pair being a glass-to-shutter conductor pair formed by the first conductive layer and one or both of the first and second conductive coatings, the second conductor pair being a shutter-to-shutter conductor pair formed by the first and second conductive coatings but not the first conductive layer. In certain example embodiments, the first conductor pair is used in extending the shutter whereas the second conductor pair is used in retracting the shutter.

In certain example embodiments, a method of operating a dynamic shade in an insulating glass (IG) unit is provided. The method comprises having an IG unit made in accordance with the techniques disclosed herein; and selectively activating the power source to move the polymer substrate between the shutter open and closed positions.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Figure 1:
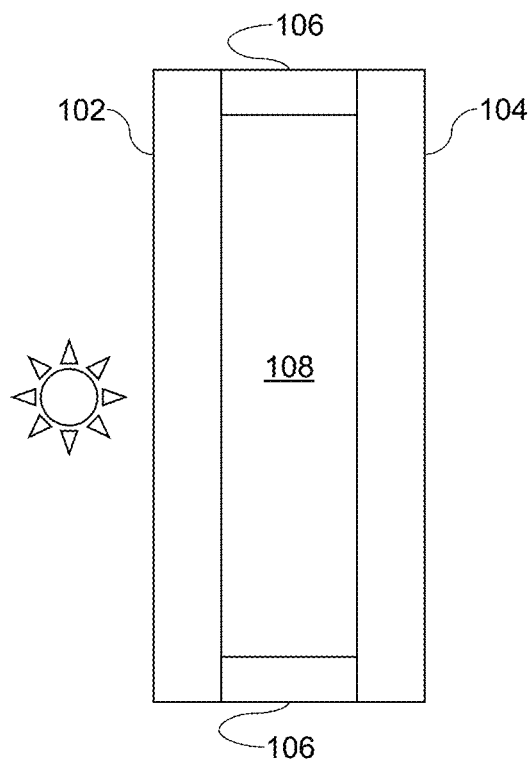
FIG. 1 is a cross-sectional, schematic view of an example insulating glass unit (IG unit or IGU)
Figure 2:
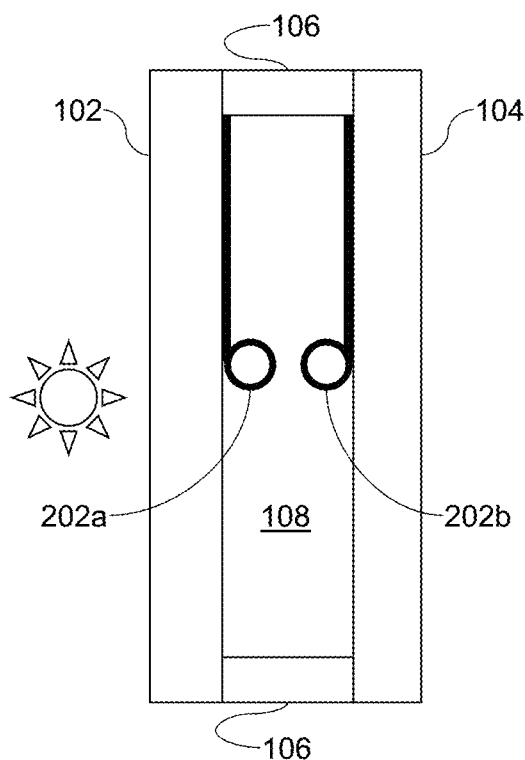
FIG. 2 is a cross-sectional, schematic view of an example IGU incorporating electric potentially-driven shades that may be used in connection with certain example embodiments.

Certain example embodiments of this invention relate to electric, potentially-driven shades that may be used with IG units, IG units including such shades, and/or methods of making the same. Referring now more particularly to the drawings, FIG. 2 is a cross-sectional, schematic view of an example insulating glass unit (IG unit or IGU) incorporating electric potentially-driven shades that may be used in connection with certain example embodiments. More specifically, FIG. 2 is similar to FIG. 1 in that first and second substantially parallel spaced apart glass substrates 102 and 104 are separated from one another using a spacer system 106, and a gap 108 is defined therebetween. First and second electric potentially-driven shades 202a and 202b are provided in the gap 108, proximate to inner major surfaces of the first and second substrates 102 and 104, respectively. As will become clearer from the description provided below, the shades 202a and 202b are controlled by the creation of an electric potential difference between the shades 202a and 202b, and conductive coatings formed on the inner surfaces of the substrates 102 and 104. As also will become clearer from the description provided below, each of shades 202a and 202b may be created using a polymer film coated with a conductive coating (e.g., a coating comprising a layer including Al, Cr, ITO, and/or the like). An aluminum-coated shade may provide for partial-to-complete reflection of visible light, and up to significant amounts of total solar energy.

The shades 202a and 202b are normally retracted (e.g., rolled up), but they rapidly extend (e.g., roll out) when an appropriate voltage is applied, in order to cover at least a portion of the substrates 102 and 104 much like, for example, a "traditional" window shade. The rolled-up shade may have a very small diameter, and typically will be much smaller than the width of the gap 108 between the first and second substrates 102 and 104, so that it can function between them and be essentially hidden from view when rolled up. The rolled-out shades 202a and 202b adhere strongly to the adjacent substrates 102 and 104.

The shades 202a and 202b extend along all or a portion of a vertical length of the visible or "framed" area of the substrates 102 and 104 from a retracted configuration to an extended configuration. In the retracted configuration, the shades 202a and 202b have a first surface area that substantially permits radiation transmission through the framed area. In the extended configuration, the shades 202a and 202b have a second surface area that substantially controls radiation transmission through the framed area. The shades 202a and 202b may have a width that extends across all or a portion of the horizontal width of the framed area of the substrates 102 and 104 to which they are attached.

Each of the shades 202a and 202b is disposed between the first and second substrates 102 and 104, and each preferably is attached at one end to an inner surface thereof (or a dielectric or other layer disposed thereon), near the tops thereof. An adhesive layer may be used in this regard. The shades 202 and 204 are shown partially rolled out (partially extended) in FIG. 2. The shades 202a and 202b and any adhesive layer or other mounting structure preferably are hidden from view so that the shades 202a and 202b are only seen when at least partially rolled out.

The diameter of a fully rolled-up shade preferably is about 1-5 mm but may be greater than 5 mm in certain example embodiments. Preferably, the diameter of a rolled-up shade is no greater than the width of the gap 108, which is typically about 10-15 mm, in order to help facilitate rapid and repeated roll-out and roll-up operations. Although two shades 202a and 202b are shown in the FIG. 2 example, it will be appreciated that only one shade may be provided in certain example embodiments, and it also will be appreciated that that one shade may be provided on an inner surface of either the inner or outer substrate 102 or 104. In example embodiments where there are two shades, the combined diameter thereof preferably is no greater than the width of the gap 108, e.g., to facilitate roll-out and roll-up operations of both shades.

An electronic controller may be provided to help drive the shades 202a and 202b. The electronic controller may be electrically connected to the shades 202a and 202b, as well as the substrates 102 and 104, e.g., via suitable leads or the like. The leads may be obscured from view through the assembled IG unit. The electronic controller is configured to provide an output voltage to the shades 202a and 202b. Output voltage in the range of about 100-500 V DC can be used for driving the shades 202a and 202b in certain example embodiments. An external AC or DC power supply, a DC battery, and/or the like may be used in this regard. It will be appreciated that higher or lower output voltage may be provided, e.g., depending on the fabrication parameters and materials that comprise the shades 202a and 202b, the layers on the substrates 102 and 104, etc.

The controller may be coupled to a manual switch, remote (e.g., wireless) control, or other input device, e.g., to indicate whether the shades 202a and 202b should be retracted or extended. In certain example embodiments, the electronic controller may include a processor operably coupled to a memory storing instructions for receiving and decoding control signals that, in turn, cause voltage to be selectively applied to control the extension and/or retraction of the shades 202a and 202b. Further instructions may be provided so that other functionality may be realized. For instance, a timer may be provided so that the shades 202a and 202b can be programmed to extend and retract at user-specified or other times, a temperature sensor may be provided so that the shades 202a and 202b can be programmed to extend and retract if user-specified indoor and/or outdoor temperatures are reached, light sensors may be provided so that the shades 202a and 202b can be programmed to extend and retract based on the amount of light outside of the structure, etc.

Although two shades 202a and 202b are shown in FIG. 2, as noted above, certain example embodiments may incorporate only a single shade. Furthermore, as noted above, such shades may be designed to extend vertically and horizontally along and across substantially the entire IG unit, different example embodiments may involve shades that cover only portions of the IG units in which they are disposed. In such cases, multiple shades may be provided to deliver more selectable coverage, to account for internal or external structures such as muntin bars, to simulate plantation shutters, etc.

In certain example embodiments, a locking restraint may be disposed at the bottom of the IGU, e.g., along its width, to help prevent the shades from rolling out their entire lengths. The locking restraint may be made from a conductive material, such as a metal or the like. The locking restraint also may be coated with a low dissipation factor polymer such as, for example, polypropylene, fluorinated ethylene propylene (FEP), polytetrafluoroethylene (PTFE), and/or the like.

Figure 3:
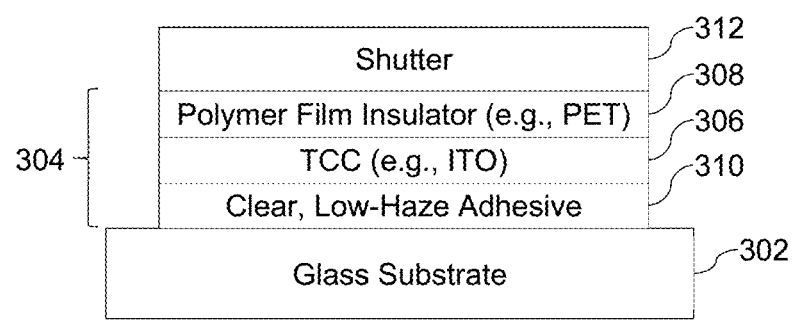
FIG. 3 is a cross-sectional view showing example on-glass components from the FIG. 2 example IGU that enable shutter action, in accordance with certain example embodiments.
Figure 4:
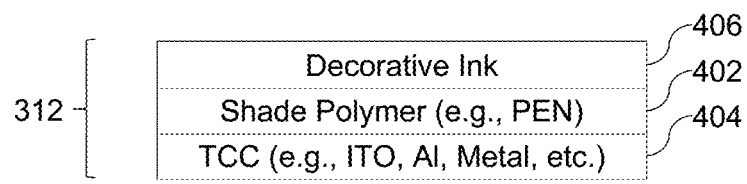
FIG. 4 is a cross-sectional view of an example shutter from the FIG. 2 example IGU, in accordance with certain example embodiments.

Example details of the operation of the shades 202a and 202b will now be provided in connection with FIGS. 3-4. More particularly, FIG. 3 is a cross-sectional view showing example on-glass" components from the FIG. 2 example IGU that enable shutter action, in accordance with certain example embodiments; and FIG. 4 is a cross-sectional view of an example shutter from the FIG. 2 example IGU, in accordance with certain example embodiments. FIG. 3 shows a glass substrate 302, which may be used for either or both of the substrates 102 and 104 in FIG. 2. The glass substrate 302 supports on-glass components 304, as well as the shutter 312. In certain example embodiments, when unrolled, the conductor 404 may be closer to the substrate 302 than the ink layer 406. In other example embodiments, this arrangement may be reversed such that, for example, when unrolled, the conductor 404 may be farther from the substrate 302 than the ink layer 406.

The on-glass components 304 include a transparent conductor 306, along with a dielectric material 308, which may be adhered to the substrate 302 via a clear, low-haze adhesive 310 or the like. These materials preferably are substantially transparent. In certain example embodiments, the transparent conductor 306 is electrically connected via a terminal to a lead to the controller. In certain example embodiments, the transparent conductor 306 serves as a fixed electrode of a capacitor, and the dielectric material 308 serves as the dielectric of this capacitor. In such cases, a dielectric or insulator film is provided, directly or indirectly, on the first conductive layer, with the dielectric or insulator film being separate from the shutter.

It will be appreciated that it is possible to put all of the dielectric layers on the shade in certain example embodiments, thereby exposing a bare conductive (flat) substrate, e.g., a glass substrate supporting a conductive coating. For example, in certain example embodiments, the polymer film insulator 308 may be provided on/integrated as a part of the shutter 312, rather than being provided on/integrated as a part of the substrate 302. That is, the shutter 312 may further support a dielectric or insulator film 308 thereon such that, when the at least one polymer substrate is in the shutter closed position and the shutter is extended, the dielectric or insulator film directly physically contacts the first conductive layer with no other layers therebetween.

The transparent conductor 306 may be formed from any suitable material such as, for example, ITO, tin oxide (e.g., $SnO_2$ or other suitable stoichiometry), etc. The transparent conductor 306 may be 10-500 nm thick in certain example embodiments. The dielectric material 308 may be a low dissipation factor polymer in certain example embodiments. Suitable materials include, for example, polypropylene, FEP, PTFE, polyethyleneterephthalate (PET), polyimide (PI), and polyethylenenapthalate (PEN), etc. The dielectric material 308 may have a thickness of 4-25 microns in certain example embodiments. The thickness of the dielectric material 308 may be selected so as to balance reliability of the shade with the amount of voltage (e.g., as thinner dielectric layers typically reduce reliability, whereas thicker dielectric layers typically require a high applied voltage for operational purposes).

As is known, many low-emissivity (low-E) coatings are conductive. Thus, in certain example embodiments, a low-E coating may be used in place of the transparent conductor 306 in certain example embodiments. The low-E coating may be a silver-based low-E coating, e.g., where one, two, three, or more layers comprising Ag may be sandwiched between dielectric layers. In such cases, the need for the adhesive 310 may be reduced or completely eliminated.

The shutter 312 may include a resilient layer 402. In certain example embodiments, a conductor 404 may be used on one side of the resilient layer 402, and a decorative ink 406 optionally may be applied to the other side. In certain example embodiments, the conductor 404 may be transparent and, as indicated, the decorative ink 406 is optional. In certain example embodiments, the conductor 404 and/or the decorative ink 406 may be translucent or otherwise impart coloration or aesthetic features to the shutter 312. In certain example embodiments, the resilient layer 402 may be formed from a shrinkable polymer such as, for example, PEN, PET, polyphenylene sulfide (PPS), polyether ether ketone (PEEK), etc. The resilient layer 402 may be 1-25 microns thick in certain example embodiments. The conductor 404 may be formed from the same or different material as that used for conductor 306, in different example embodiments. Metal or metal oxide materials may be used, for example. In certain example embodiments, a 10-50 nm thick material including a layer comprising, for example, ITO, Al, Ni, NiCr, tin oxide, and/or the like, may be used. In certain example embodiments, the resistance of the conductor 404 may be in the range of 40-200 ohms/square.

The decorative ink 406 may include pigments, particles, and/or other materials that selectively reflect and/or absorb desired visible colors and/or infrared radiation.

As FIG. 2 shows, the shades 202a and 202b ordinarily are coiled as spiral rolls, with an outer end of the spiral affixed by an adhesive to the substrates 102 and 104 (e.g., or the dielectric thereon). The conductor 404 may be electrically connected via a terminal to a lead or the like and may serve as a variable electrode of a capacitor having the conductor 306 as its fixed electrode and the dielectric 308 as its dielectric.

When an electrical drive is provided between the variable electrode and the fixed electrode, e.g., when an electric drive of voltage or current is applied between the conductor 404 of the shutter 312 and the conductor 306 on the substrate 302, the shutter 312 is pulled toward the substrate 302 via an electrostatic force created by the potential difference between the two electrodes. The pull on the variable electrode causes the coiled shade to roll out. The electrostatic force on the variable electrode causes the shutter 312 to be held securely against the fixed electrode of the substrate 302. As a result, the ink coating layer 406 of the shade selectively reflects or absorbs certain visible colors and/or infrared radiation. In this way, the rolled-out shade helps control radiation transmission by selectively blocking and/or reflecting certain light or other radiation from passing through the IG unit, and thereby changes the overall function of the IG unit from being transmissive to being partially or selectively transmissive, or even opaque in some instances.

When the electrical drive between the variable electrode and the fixed electrode is removed, the electrostatic force on the variable electrode is likewise removed. The spring constant present in the resilient layer 402 and the conductor 404 causes the shade to roll up back to its original, tightly-wound position. Because movement of the shade is controlled by a primarily capacitive circuit, current essentially only flows while the shade is either rolling out or rolling up. As a result, the average power consumption of the shade is extremely low. In this way, several standard AA batteries may be used to operate the shade for years, at least in some instances.

In one example, the substrate 302 may be 3 mm thick clear glass commercially available from the assignee. An acrylic-based adhesive having a low haze may be used for adhesive layer 310. Sputtered ITO having a resistance of 100-300 ohms/square may be used for the conductor 306. The polymer film may be a low-haze (e.g., <1% haze) PET material that is 12 microns thick. A PVC-based ink available from Sun Chemical Inc. applied to 3-8 microns thickness may be used as the decorative ink 406. A PEN material commercially available from DuPont that is 6, 12, or 25 microns thick may be used as the resilient layer 402. For an opaque conductor 406, evaporated Al that has a nominal thickness of 375 nm may be used. For a transparent option, sputtered ITO may be used. In both cases, the resistance may be 100-400 ohms/square. The ITO or other conductive material(s) may be sputtered onto, or otherwise formed on, their respective polymer carrier layers in certain example embodiments. Of course, these example materials, thicknesses, electrical properties, and their various combinations and sub-combinations, etc., should not be deemed limiting unless specifically claimed.

As will be appreciated from the description above, the dynamic shade mechanism uses a coiled polymer with a conductive layer. In certain example embodiments, the conductor 402 may be formed to be integral with the polymer 402, or it may be an extrinsic coating that is applied, deposited, or otherwise formed on the polymer 402. As also mentioned above, decorative ink 406 may be used together with a transparent conductor material (e.g., based on ITO) and/or an only partially transparent or opaque conductive layer. An opaque or only partially transparent conductive layer may obviate the need for ink in certain example embodiments. In this regard, a metal or substantially metallic material may be used in certain example embodiments. Aluminum is one example material that may be used with or without a decorative ink.

One or more overcoat layers may be provided on the conductor to help reduce the visible light reflection and/or change the color of the shade to provide a more aesthetically pleasing product, and/or by "splitting" the conductor so that a phase shifter layer appears therebetween. Overcoats thus may be included to improve the aesthetic appearance of the overall shade. The shutter 312 thus may include a reflection-reducing overcoat, dielectric mirror overcoat, or the like. Such reflection-reducing overcoats and dielectric mirror overcoats may be provided over a conductor 404 and on a major surface of the shade polymer 402 comprising (for example) PEN opposite decorative ink 406. It will be appreciated, however, that the ink 406 need not be provided, e.g., if the conductor 404 is not transparent. Mirror coatings such as, for example, Al, may obviate the need for decorative ink 406. It also will be appreciated that the reflection-reducing overcoat and the dielectric mirror overcoat may be provided on major surfaces of the shade polymer 402 comprising (for example) PEN opposite the conductor 404 in certain example embodiments.

In addition to or in place of using optical interference techniques to reduce reflection, it also is possible to add a textured surface to the base polymer, modifying the conductive layer chemically or physically, and/or add an ink layer, e.g., to accomplish the same or similar ends, achieve further reductions in unwanted reflection, etc.

Figure 5:
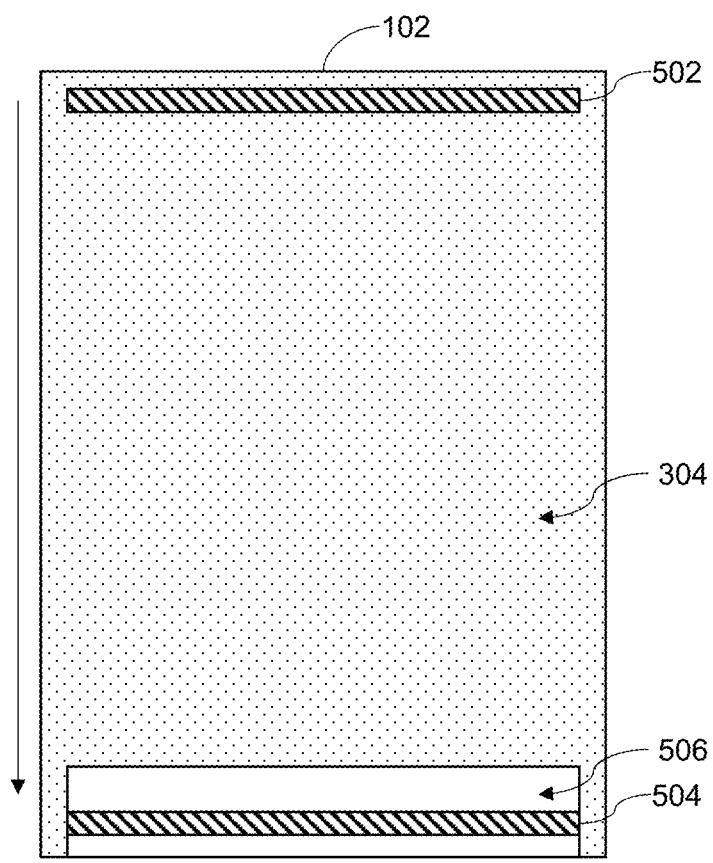
FIG. 5 is a plan view of a substrate incorporating on-glass components from the FIG. 2 example IGU, along with an area promoting a conductivity difference, in accordance with certain example embodiments.

FIG. 5 is a plan view of a substrate incorporating on-glass components from the FIG. 2 example IGU, along with an area 506 promoting a conductivity difference, in accordance with certain example embodiments. FIG. 5 includes a mounting structure 502 and a locking restraint 504.

Given that the thin film and/or other materials comprising the shutter should survive numerous rolling and unrolling operations in accordance with the functioning of the overall shade, it will be appreciated that the materials may be selected, and that the overall layer stack formed, to have mechanical and/or other properties that facilitate the same.

cal properties degrade significantly, the shade may no longer function (e.g., the shade will not retract).

In order to help the shade better withstand elevated temperature environments, a substitution from PEN to polymers with better elevated temperature resistance may be advantageous. Two potential polymers include PEEK and Polyimide (PI or Kapton). PEEK has a Tg of ~142 degrees C. and Kapton HN has a Tg of ~380 degrees C. Both of these materials have better mechanical properties in elevated temperature environments, compared to PEN. This is especially true at temperature above 100 degrees C. The following chart demonstrates this, referencing mechanical properties of PEN (Teonex), PEEK, and PI (Kapton HN). UTS stands for ultimate tensile strength, in the chart.

|  |  | PEN | PEEK | PI |
| --- | --- | --- | --- | --- |
| 25 degrees C. | UTS (psi) | 39,000 | 16,000 | 33,500 |
|  | Modulus (psi) | 880,000 | 520,000 | 370,000 |
|  | Yield (psi) | 17,500 |  | 10,000 |
| 200 degrees C. | UTS (psi) | 13,000 | 8,000 | 20,000 |
|  | Modulus (psi) |  |  | 290,000 |
|  | Yield (psi) | <1,000 |  | 6,000 |
| Tg |  | ~121 degrees C. | ~143 degrees C. | ~380 degrees C. |

For example, an excess of stress in a thin film layer stack typically is seen as disadvantageous. However, in some instances, excess stress can lead to cracking, "delamination"/removal, and/or other damage to the conductor 404 and/or an overcoat layer or layers formed thereon. Thus, low stress (and in particular low tensile stress) may be particularly desirable in connection with the layer(s) formed on the shutters' polymer bases in certain example embodiments.

In this regard, the adhesion of sputtered thin films depends on, among other things, the stress in the depositing film. One way stress can be adjusted is with deposition pressure. Stress versus sputter pressure does not follow a monotonic curve but instead inflects at a transition pressure that in essence is unique for each material and is a function of the ratio of the material's melting temperature to the substrate temperature. Stress engineering can be accomplished via gas pressure optimizations, bearing these guideposts in mind.

Other physical and mechanical properties of the shade that may be taken into account include the elastic modulus of the polymer and the layers formed thereon, the density ratio of the layers (which may have an effect on stress/strain), etc. These properties may be balanced with their effects on internal reflection, conductivity, and/or the like.

As is known, temperatures internal to an IG unit may become quite elevated. For example, it has been observed that an IG unit in accordance with the FIG. 2 example and including a black pigment may reach a temperature of 87 degrees C., e.g., if the black portion of the shade is facing the sun in elevated temperature, high solar radiation climates (such as, for example, in areas of the southwest United States such as Arizona). The use of a PEN material for the rollable/unrollable polymer may be advantageous, as PEN has a higher glass transition temperature (~120 degrees C.), compared to other common polymers such as PET (Tg=67-81 degrees C.), Poly Propylene or PP (Tg=~32 degrees C.). Yet if the PEN is exposed to temperatures approaching the glass transition temperature, the performance of the material's otherwise advantageous mechanical properties (including its elastic modulus, yield strength, tensile strength, stress relaxation modulus, etc.) may degrade overtime, especially with elevated temperature exposure. If these mechani- It will be appreciated that the modification of the shade base material from its current material (PEN) to an alternate polymer (e.g., PEEK or PI/Kapton) that has increased elevated temperature mechanical properties may be advantageous in the sense that it may enable the shade to better withstand internal IG temperatures, especially if the shade is installed in higher temperature climates. It will be appreciated that the use of an alternative polymer may be used in connection with the shutter and/or the on-glass layer in certain example embodiments.

In addition, or as an alternative, certain example embodiments may use a dyed polymer material. For example, a dyed PEN, PEEK, PI/Kapton, or other polymer may be used to created shades with an assortment of colors and/or aesthetics. For instance, dyed polymers may be advantageous for embodiments in transparent/translucent applications, e.g., where the shade conductive layer is a transparent conductive coating or the like.

Alternate conductive materials that beneficially modify the spring force of the coiled shade to make it usable for various lengths may be used. In this regard, properties of the conductive layer that increase the strength of the coil include an increase in the elastic modulus, an increase in the difference in coefficient of thermal expansion (CTE) between the polymer substrate and the conductive layer, and an increase in the elastic modulus to density ratio. Some of the pure metals that can be used to increase coil strength compared to Al or Cr include Ni, W, Mo, Ti, and Ta. The elastic modulus of studied metal layers ranged from 70 GPa for Al to 330 GPa for Mo. The CTE of studied metal layers ranged from $23.5 \times 10^{-6}$/k for Al down to $4.8 \times 10^{-6}$/k for Mo. In general, the higher the elastic modulus, the higher the CTE mismatch between the PEN or other polymer and the metal, the lower the density, etc., the better the material selection in terms of coil formation. It has been found that incorporating Mo and Ti based conductive layers into shades has resulted in a spring force of the coil that is significantly higher than that which is achievable with Al. For example, a polymer substrate based on PEN, PEEK, PI, or the like, may support (in order moving away from the substrate) a layer comprising Al followed by a layer comprising Mo.

Thin film layer(s) in a conductive coating and/or a conductive coating itself with a greater modulus and lower CTE than Al may be provided.

A PEN, PI, or other polymer substrate used as a shutter may support a thin layer comprising Al for stress-engineering purposes, with a conductive layer comprising Mo, Ti, or the like directly or indirectly thereon. The conductive layer may support a corrosion-resistant layer comprising Al, Ti, stainless steel, or the like. The side of the substrate opposite these layers optionally may support a decorative ink or the like.

Certain example embodiments may include microscopic perforations or through-holes that allow light to pass through the shade and provide progressive amounts of solar transmittance based on the angle of the sun.

Further manufacturing, operation, and/or other details and alternatives may be implemented. See, for example, U.S. Pat. Nos. 8,982,441; 8,736,938; 8,134,112; 8,035,075; 7,705,826; and 7,645,977, as well as U.S. application Ser. No. 16/028,546 filed Jul. 6, 2018; the entire contents of each of which is hereby incorporated herein by reference. Among other things, perforation configurations, polymer materials, conductive coating designs, stress engineering concepts, building-integrated photovoltaic (BIPV), and other details are disclosed therein and at least those teachings may be incorporated into certain example embodiments.

As will be appreciated from the description above, one issue associated with the dynamic shade design relates to formation of the retractable shutter. In particular, care may be taken to select and implement materials with a spring force sufficient to enable automatic retraction over time. It oftentimes will be important to tightly control manufacturing parameters to ensure that the shutter is properly created so as to have a spring force sufficient for retraction, and to ensure that the spring force remains sufficient to cause retraction over the life of the window or other product into which the shutter is integrated. If the spring constant is not sufficient, or if it degrades over time, the shutter may become "stuck" in an extended or partially extended position. This may be the case even if voltage is not applied, simply because the spring constant will be insufficient to cause the re-rolling. Furthermore, even if spring constants are properly formed and remain sufficiently high to at least in theory provide for retraction over time, after repeat usage, electrostatic charges can build up. This charge build-up may cause the shutter to become "stuck" in an extended or partially extended position in a manner similar to the above, even when power is not provided. "Pole swapping," which in this context refers to a natural phenomenon that can hinder the operation of the shutter and might be thought of as relating to surface charge (on the dielectric surface) or semi-permanent electrostatic polarization (in the dielectric volume), also can hinder the operation of the shutter. And because of the closed system, it can be difficult and sometimes even impossible to repair and/or replace faulty shutters and/or shutters that have "worn out" over time, systems where excessive charges have built-up and/or where poles have switched, etc.

To help address the tick sound issue, certain example embodiments use a different potential difference to help roll up the shutter. That is, in certain example embodiments, one electric potential can be used to help extend the shutter in one direction, and another electric potential to retract the shade in another direction opposite to the first. For instance, a shutter may be designed with a layer stack such that a circuit connected thereto may be selectively switchable between providing a down force and an up force. As will be described in greater detail below, an electric field can be provided to facilitate the retraction. The electric field may be set up to simply encourage retraction (e.g., if the shutter becomes stuck) in certain example embodiments. In certain example embodiments, the electric field may be set up for the entire retraction operation.

In this way, certain example embodiments can help address pole swapping and charge build-up issues, while also providing an approach that fights aging and deterioration of the spring over time (e.g., thereby promoting durability and enhancing longevity). In addition, or in the alternative, certain example embodiments enable materials with a lower spring constant to be used, as the techniques may be used to simply "encourage" a small amount of winding at the beginning of the retraction, and/or at one or more times when the retraction stalls. This also may be advantageous because manufacturing tolerances may be loosened, and the ease of manufacturing may be promoted.

Certain example embodiments provide a dynamic shade with alternating conductive and dielectric layers. For example, at least four layers alternating between conductive layers and dielectric layers may be provided in certain example embodiments. When the shade is partly curled (e.g., part of the shade remains flat), the conductive layers are separated from each other by the dielectric layers. A voltage applied between the conductive layers creates an electric field that attracts the curled portion to the flattened portion, retracting the shade.

Figure 6:
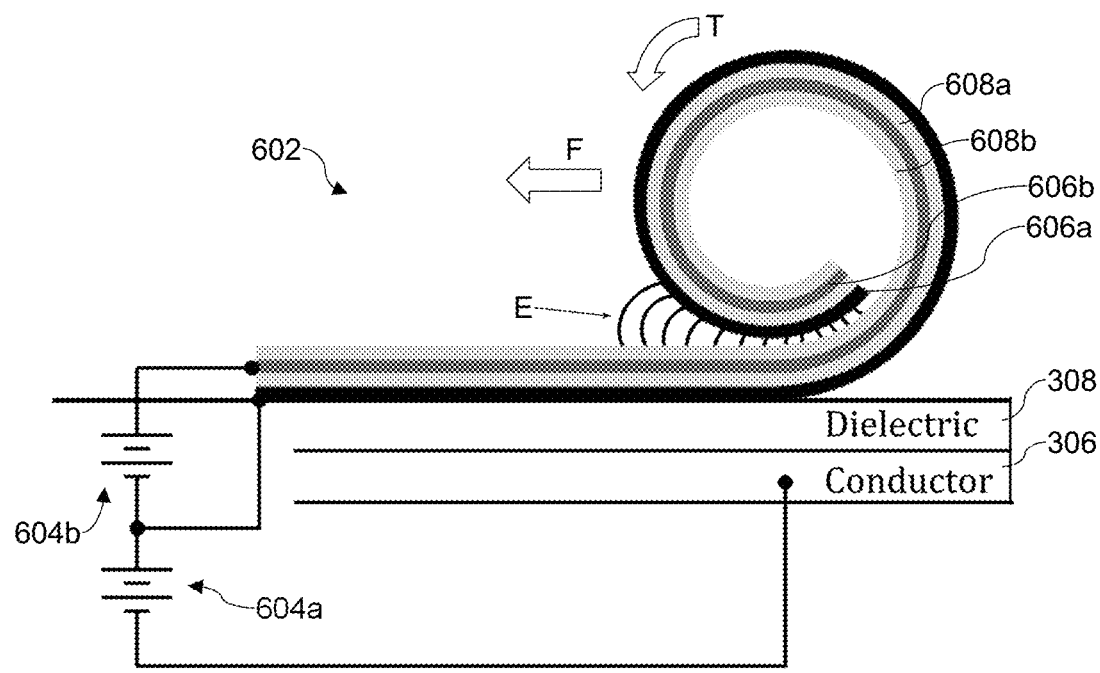
FIG. 6 is a schematic view of a first example shade with an electrostatic retraction feature implemented using two independent voltage sources, according to certain example embodiments.

FIG. 6 is a schematic view of a first example shade 602 with an electrostatic retraction feature implemented using two independent voltage sources 604a-604b, according to certain example embodiments. The two voltage sources 604a-604b are independently controllable. A first voltage source provides the usual functionality as a standard shade. In FIG. 6, the first voltage source 604a is shown as the lower voltage symbol, whose negative terminal connects to the backplane conductor, which may be the conductor 306 located below the dielectric 308 in the on-glass components 304 (described, for example, in connection with FIG. 3). In ordinary operation, this is a variable source, whose polarity and voltage can reverse.

The second voltage source actuates the reverse rolling force. In FIG. 6, the second voltage source 604b is shown as the as the upper voltage symbol. Increasing the potential difference of the second voltage source 604b creates an electric field E between first and second conductive layers 606a-606b on the rollable shutter. The first and second conductive layers 606a-606b are separated by first and second dielectric layers 608a-608b, as will be appreciated from the above. The resulting torque T acts counterclockwise to produce a force F acting to the left (in this schematic view and in this example orientation). It will be appreciated that, in operation, the resulting torque acts in a rolling direction opposite to the unfurling (generally counterclockwise for vertical and substantially vertical installations) that produce a force acting towards the retracted position (generally the top for vertical and substantially vertical installations). Of course, it will be appreciated that the torque will depend in part on the viewpoint. For instance, if the shade unfurls to the left, or if the same shade is viewed from the opposing edge, the torque appears clockwise.

Figure 7:
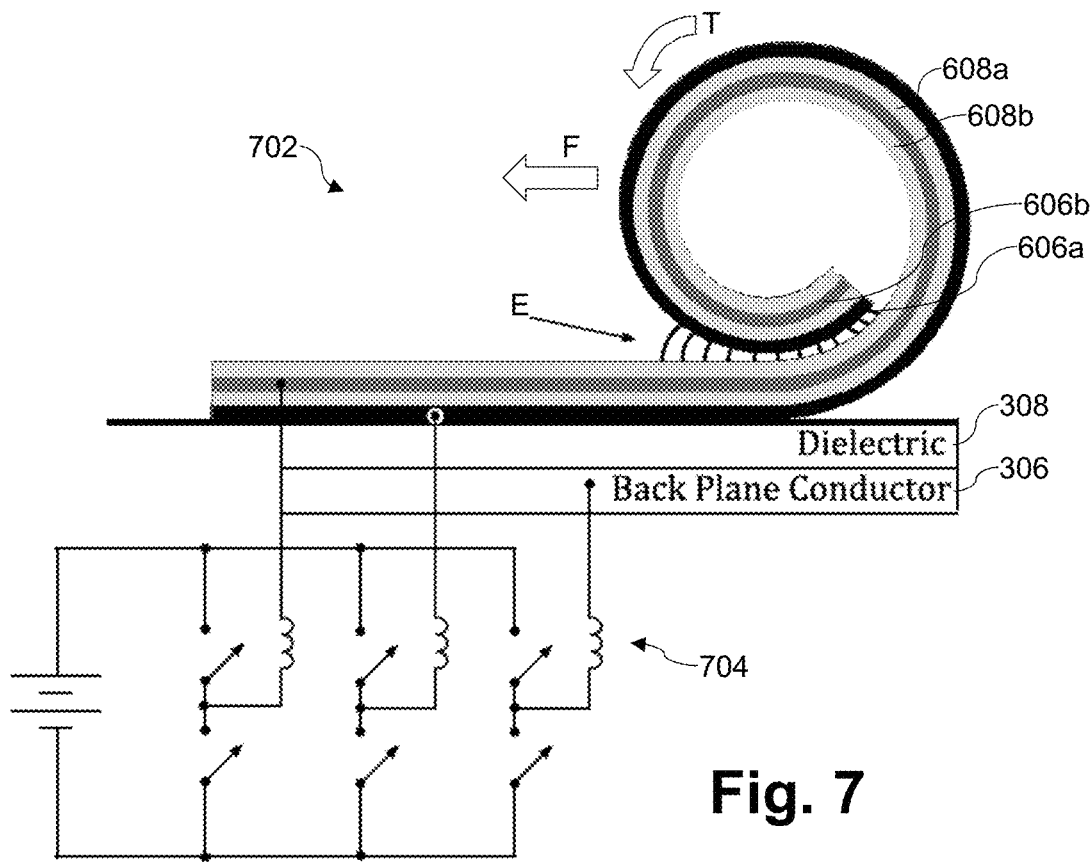
FIG. 7 is a schematic view of a second example shade with an electrostatic retraction feature implemented using voltage sources, according to certain example embodiments.

FIG. 7 is a schematic view of a second example shade 702 with an electrostatic retraction feature implemented using voltage sources, according to certain example embodiments. The FIG. 7 shade 702 is similar to the FIG. 6 shade 602. As above, increasing the potential difference creates an electric field E between first and second conductive layers 606a-

606b on the rollable shutter. The first and second conductive layers 606a-606b are separated by first and second dielectric layers 608a-608b. The resulting torque T produces a force F, acting to encourage the shutter as a whole to retract. FIG. 7 differs from FIG. 6 in terms of the control circuitry 704 used. For instance, in certain example embodiments, a two-phase H-bridge with a series connected inductor may be extended and generalized to include a third electrode, forming a three-phase bridge. Three-phase bridge circuits can be realized using low-cost gate driver technology commonly used in high voltage motor controllers (such as for the hybrid automotive industry). The circuitry 704 includes three individually connected inductors in series with each bridge output terminal to enable energy recovery for high efficiency.

As noted above, 100-500 V DC is appropriate for extension in most applications, and the same or similar range may be used for retraction. In certain example embodiments, the voltage output of a bridge output terminal can be maintained anywhere between +− supply voltage by appropriate restriction of the current. Appropriate pulse width modulation (PWM) waveforms may be used in certain example embodiments. In this regard, PWM generally requires voltage and/or current measurement to provide feedback signals in a control loop. It will be appreciated that the precise duty cycle and duration can be determined by those skilled in the art. In certain example embodiments, a two-phase "H-bridge" or three-phase bridges may be seen as being advantageous over the circuit of FIG. 6 (for example), as only a single voltage source is necessary.

As described above, a shutter 312 may include a biaxially-oriented polymer-based layer (e.g., of or including PEN or the like). The polymer-based layer may be coated with a metal conductor on one side, followed by ink coatings on one or both sides. In this construction, both the ink layer(s) and the polymer-based layer act as dielectrics.

Figure 8:
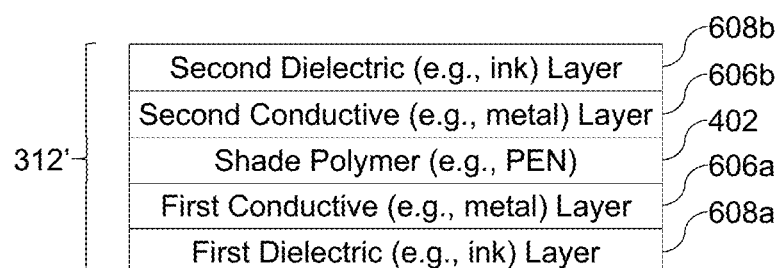
FIG. 8 is a cross-sectional view of a first shutter usable in connection with electrostatic retraction, in accordance with certain example embodiments.

FIG. 8 is a cross-sectional view of a first shutter 312' usable in connection with electrostatic retraction, in accordance with certain example embodiments. The shutter 312' for use with electrostatic retraction may have alternating conductive and dielectric layers, as noted above. Four layers, as shown in FIGS. 6-7, for example, may be provided as a minimum in certain example embodiments.

The shutter 312' for use with electrostatic retraction according to FIG. 8 may be constructed by adapting or changing the FIG. 4 example. For instance, in certain example embodiments, both sides of a polymer-based layer 402 (e.g., of or including PEN) may be coated with metal or other conductive coatings, followed by ink coatings provided on one or both sides. Providing ink to both sides may help create a more desirable aesthetic appearance in certain example embodiments, as the shade will not have a shiny metal appearance when viewed from either side of the shade. Thus, in FIG. 8, first and second conductive (e.g., metal) layers 606a-606b sandwich the polymer-based layer 402, and first and second dielectric (e.g., ink) layers 608a-608b also sandwich the polymer-based layer 402. As shown in FIG. 8, the that first and second dielectric layers 608a-608b are provided on surfaces opposite the surfaces of the first and second conductive layers 606a-606b that are adjacent to the polymer-based layer 402.

Example thicknesses for the layers are provided in the table below:

| Layer/Material | Preferred Thickness | More Preferred Thickness | Example Thickness |
| --- | --- | --- | --- |
| Ink (608a) | 1-10 µm | 2-5 µm | 2 µm |
| Aluminum (606a) | 100-600 nm | 200-450 nm | 300 nm |
| PEN (402) | 5-100 µm | 5-25 µm | 12 µm |
| Aluminum (606b) | 5-100 nm | 20-75 nm | 50 nm |
| Ink (608b) | 1-10 µm | 2-5 µm | 2 µm |

Generally, a thickness of at least 30 nm when aluminum is used for layer 606b is desirable to enable good electrical contact. It will be appreciated that the ink itself may be formulated for conductivity in certain example embodiments. In certain of such cases, one conductive layer (e.g., layer 606b comprising aluminum) may be replaced with a conductive ink, e.g., in essence combining layers 606b and 608b into a single layer.

In certain example embodiments, the ink layers have the same thickness (e.g., 2 µm). Although different inks and/or colors vary in opacity, a 2 µm thickness generally is approximately the minimum necessary to produce an opaque coating. The shade polymer (e.g., PEN) layer and the first conductive layer of or including aluminum may be standard thicknesses for shutters that lack electrostatic retraction functionality. The "added" second conductive layer of or including aluminum may be provided at a thickness that is less than the first conductive layer of or including aluminum. This may be desirable in certain example embodiments to help reduce the changes in mechanical properties relative to the shade. For example, a good shade that is unlike to crack or delaminate and has a good spring constant can be realized. This thickness arrangement has been found to be advantageous in helping to maintain compatibility with thermal processes used in forming shades including, for example, processing the flat material to produce the curl, in certain example embodiments.

Figure 9:
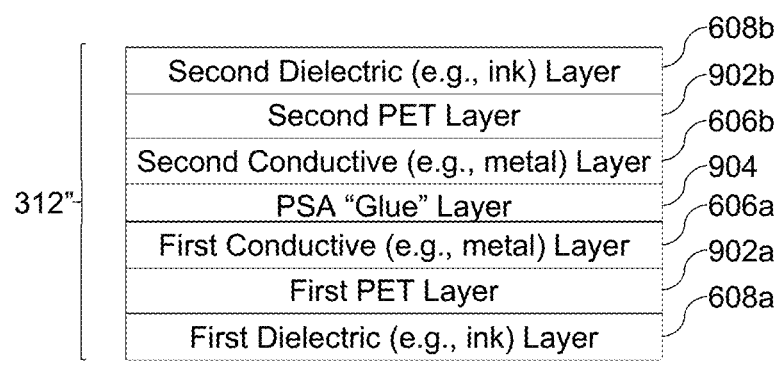
FIG. 9 is a cross-sectional view of a second shutter usable in connection with electrostatic retraction, in accordance with certain example embodiments.

FIG. 9 is a cross-sectional view of a second shutter 312" usable in connection with electrostatic retraction, in accordance with certain example embodiments. The FIG. 9 example embodiment may be produced by differential tension lamination in certain example embodiments. For instance two (or more) main components may be manufactured. The first component may include a first polymer-based layer 902a (of or including PET, PEN, and/or the like). This first polymer-based layer 902a supports, on opposite major surfaces thereof, the first dielectric (e.g., ink) layer 608a and the first conductive (e.g., metal) layer 606a. In a similar fashion, the second component may include a second polymer-based layer 902b (of or including PET, PEN, and/or the like). The second polymer-based layer 902b supports, on opposite major surfaces thereof, the second dielectric (e.g., ink) layer 608b and the second conductive (e.g., metal) layer 606b.

A mechanical spring force is developed in the differential tension between the first and second conductive layers 902a-902b (which, as above, may be of or include aluminum). A pressure sensitive adhesive (PSA) or "glue" layer 904 connects the two components together. In addition, the glue 904 acts as a dielectric to separate the first and second conductive layers 902a-902b. In addition, or in the alternative, heat bonding may be used in certain example embodiments. In this regard, polyethylene (e.g., LDPE) may be bonded without added adhesive at reasonable temperatures compatible with other processing operations. In this example, electrostatic retraction is caused by an electric field that acts through both ink layers 608a-608b and both PET layers 902a-902b.

Example thicknesses for the layers are provided in the table below:

| Layer/Material | Preferred Thickness | More Preferred Thickness | Example Thickness |
|---|---|---|---|
| Ink (608a) | 1-10 μm | 2-5 μm | 2 μm |
| PET (902a) | 1-50 μm | 2-25 μm | 5 μm |
| Aluminum (606a) | 100-600 nm | 200-450 nm | 300 nm |
| PSA Glue (904) | 5-100 μm | 5-25 μm | 12 μm |
| Aluminum (606b) | 100-600 nm | 200-450 nm | 300 nm |
| PET (902b) | 1-50 μm | 2-25 μm | 5 μm |
| Ink (608b) | 1-10 μm | 2-5 μm | 2 μm |

Figure 10:
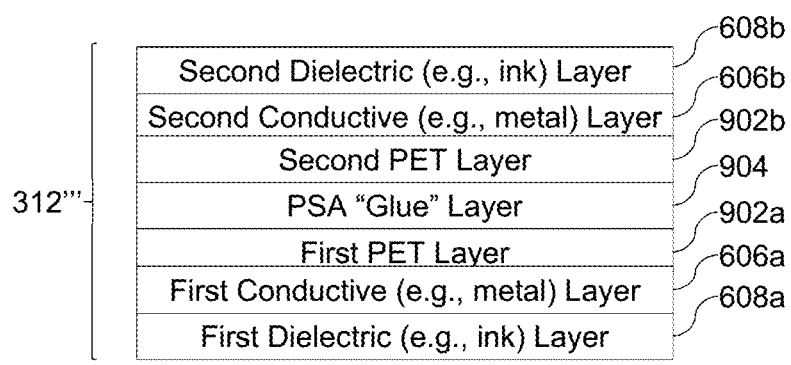
FIG. 10 is a cross-sectional view of a third shutter usable in connection with electrostatic retraction, in accordance with certain example embodiments.

In certain example embodiments, different materials may be used for the conductive (e.g., metal) layers that in the table above include layers 606a and 606b comprising aluminum, and/or different materials may be used for the polymer (e.g., PET) layers that in the table above include layers 902a and 902b comprising PET. For instance, PET, PEN, and/or the like may be used. In certain example embodiments, the order of the conductive and polymer layers may be reversed. For instance, the following order of layers may be used in certain example embodiments: ink/conductive (e.g., metal) layer/polymer/(optional) glue/polymer conductive (e.g., metal) layer/ink. FIG. 10, which is a cross-sectional view of a third shutter 312''' usable in connection with electrostatic retraction, in accordance with certain example embodiments, shows this arrangement. This arrangement may be advantageous in certain example embodiments, in that it helps increase the effective thickness of the dielectrics separating the two conductive layers. This will decrease the fixed value capacitance that does not contribute to the retraction force but does require energy to charge. The same or similar thicknesses may be used in this arrangement.

The total effective dielectric thickness includes the thicknesses of the ink layers as well as the PET layers, plus any entrapped air. In certain example embodiments, this thickness may be 4-120 μm, more preferably 8-60 μm, with an example being 14 μm. In certain example embodiments, the thicknesses of the first and second ink layers may be the same or substantially the same. In certain example embodiments, the thicknesses of the first and second PET layers may be the same or substantially the same. In certain example embodiments, the thicknesses of the first and second conductive (e.g., metal aluminum or other material) layers may be the same or substantially the same. In this case, "substantially the same" means thickness variations of no more than 15%, more preferably thickness variations of no more than 10%. Having a common thickness is available here and not above, at least in some instances. For thermally processed shades with equal aluminum thicknesses, the stress in the aluminum layers would counteract each other to result in very weak shades, for example. Ordinarily, the compression in a single aluminum layer would be counterbalanced by tension in the polymer (e.g., PEN) layer.)

Although the examples discussed in connection with FIG. 8-9 list several candidate materials for the conductive and polymer-based layers, it will be appreciated that any of the materials described herein (and/or other suitable materials) may be used in place of, or together with, those materials. For instance, in certain example embodiments, the conductive layers may be of or include Al, Cu, Mo, Ti, NiCr, and/or the like. Copper has been found to be advantageous in that it includes a high resilience (elastic energy storage at yield stress) of available metal coatings, and maximum shade length has been found to correlate directly with resilience. For high performance, an interleaved structure of aluminum with 60 nm copper, for example, may be implemented, and may provide a high level of resilience. In certain example embodiments, the polymer-based layers may be of or include PEN, PET, PI, and/or the like. Although pressure sensitive adhesives have been described, it will be appreciated that other materials may be used to connect polymer-based and/or other materials together. Laminates and other adhesives may be used, for instance.

An advantage of the electrostatic retraction concept described herein is that the electric field increases pressure between shade windings. This pressure increases the normal force between layers and increases interwinding friction forces. If the interwinding static friction force is high enough, the windings cannot slide upon each other. Without sliding, the shade will track in a straight direction and will prevent telescoping and skewing. Thus, certain example embodiments are advantageous in that they reduce the likelihood (and sometimes prevent the occurrence) of skewing and/or telescoping.

In certain example embodiments, voltage may be applied and left on until the shade is fully retracted. In certain example embodiments, voltage may be provided to create the electrostatic force for retraction at one or more predefined times and/or in accordance with a timing pattern. For example, when retraction is triggered, voltage may be provided to create the electrostatic force for retraction immediately and at predefined time intervals (e.g., every 2-5 ms). The voltage for retraction may be cycled on and off in accordance with a predefined pattern until the shade is determined to be in its fully retracted position in certain example embodiments. A determination of fully retraction may be made using optical means (e.g., scanning to determine whether the shade is rolled up at the top or other desired location of the article in which it is disposed), by triggering a manual actuator (e.g., caused by the roll achieving its full thickness), through electrical sensing (e.g., based on the conductive layers making contact with a bus line or the like provided at the top or other desired location of the article in which it is disposed), etc.

In certain example embodiments, the cycling may take place over a time period during which the shade is anticipated to retract (e.g., based on testing or the like). For instance, if the shade is known or expected to become fully retracted in 10 ms, 5 pulses may be provided at 2 ms intervals may be provided to "encourage" the full retraction.

In addition or as alternative to providing a fixed timing for pulses to encourage retraction, optics, mechanical actuators, electrical means, and/or the like, may be used in a similar manner as that described above, to determine whether to provide an "on-demand" voltage to encourage retraction. That is, these means may be provided to help determine whether the shutter is "stuck" in an extended or only partially retracted position. If the shutter is determined to be stuck, regardless of whether fixed timings are used, a voltage may be created to help encourage the torque associated with retraction rolling.

As still another option that can be used with the above, manual operation may trigger voltage to encourage retraction. This manual action may be encouraged when a human user notices that the shutter is stuck, has telescoped, etc.

The IG units described herein may incorporate low-E coatings on any one or more of surfaces 1, 2, 3, and 4. As noted above, for example, such low-E coatings may serve as the conductive layers for shades. In other example embodiments, in addition to or apart from serving and conductive layers for shades, a low-E coating may be provided on another interior surface. For instance, a low-E coating may be provided on surface 2, and a shade may be provided with respect to surface 3. In another example, the location of the shade and the low-E coating may be reversed. In either case, a separate low-E coating may or may not be used to help operate the shade provided with respect to surface three. In certain example embodiments, the low-E coatings provided on surfaces 2 and 3 may be silver-based low-E coatings. Example low-E coatings are set forth in U.S. Pat. Nos. 9,802,860; 8,557,391; 7,998,320; 7,771,830; 7,198,851; 7,189,458; 7,056,588; and 6,887,575; the entire contents of each of which is hereby incorporated by reference. Low-E coatings based on ITO and/or the like may be used for interior surfaces and/or exterior surfaces. See, for example, U.S. Pat. Nos. 9,695,085 and 9,670,092; the entire contents of each of which is hereby incorporated by reference. These low-E coatings may be used in connection with certain example embodiments.

Antireflective coatings may be provided on major surfaces of the IG unit, as well. In certain example embodiments, an AR coating may be provided on each major surface on which a low-E coating and shade is not provided. Example AR coatings are described in, for example, U.S. Pat. Nos. 9,796,619 and 8,668,990 as well as U.S. Publication No. 2014/0272314; the entire contents of each of which is hereby incorporated by reference. See also U.S. Pat. No. 9,556,066, the entire contents of which is hereby incorporated by reference herein. These AR coatings may be used in connection with certain example embodiments.

The example embodiments described herein may be incorporated into a wide variety of applications including, for example, interior and exterior windows for commercial and/or residential application, skylights, doors, merchandizers such as refrigerators/freezers (e.g., for the doors and/or "walls" thereof), vehicle applications, etc.

Although certain example embodiments have been described in connection with IG units including two substrates, it will be appreciated that the techniques described herein may be applied with respect to so-called triple-IG units. In such units, first, second, and third substantially parallel spaced apart substrates are separated by first and second spacer systems, and shades may be provided adjacent to any one or more of the interior surfaces of the innermost and outermost substrates, and/or to one or both of the surfaces of the middle substrate.

Although certain example embodiments have been described as incorporating glass substrates (e.g., for use of the inner and outer panes of the IG units described herein), it will be appreciated that other example embodiments may incorporate a non-glass substrate for one or both of such panes. Plastics, composite materials, and/or the like may be used, for example. When glass substrates are used, such substrates may be heat treated (e.g., heat strengthened and/or thermally tempered), chemically tempered, left in the annealed state, etc. In certain example embodiments, the inner or outer substrate may be laminated to another substrate of the same or different material.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, an insulating glass (IG) unit is provided. First and second substrates each have interior and exterior major surfaces, with the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates, the shade including: a first conductive layer provided, directly or indirectly, on the interior major surface of the first substrate; and a shutter including at least one polymer substrate, first and second conductive coatings, and first and second dielectric layers, wherein the at least one polymer substrate is extendible to a shutter closed position and retractable to a shutter open position. The first and/or second conductive coatings are electrically connectable to a power source that is controllable to set up (a) a first electric potential difference to create first electrostatic forces to drive the at least one polymer substrate to the shutter closed position, and (b) a second electric potential difference to create second electrostatic forces to encourage the at least one polymer substrate to at least partially retract.

In addition to the features of the previous paragraph, in certain example embodiments, a dielectric or insulator film may be provided, directly or indirectly, on the first conductive layer, e.g., with the dielectric or insulator film being separate from the shutter. Alternatively, in addition to the features of the previous paragraph, in certain example embodiments, the shutter may further support a dielectric or insulator film thereon such that, when the at least one polymer substrate is in the shutter closed position and the shutter is extended, the dielectric or insulator film directly physically contacts the first conductive layer with no other layers therebetween.

In addition to the features of either of the two previous paragraphs, in certain example embodiments, the first conductive layer and the first and second conductive coatings may collectively form first and second conductor pairs, e.g., with the first conductor pair being a glass-to-shutter conductor pair formed by the first conductive layer and one or both of the first and second conductive coatings, and with the second conductor pair being a shutter-to-shutter conductor pair formed by the first and second conductive coatings but not the first conductive layer.

In addition to the features of any of the three previous paragraphs, in certain example embodiments, the at least one polymer substrate may include first and second major surfaces, the first major surface supporting the first conductive coating and the first dielectric layer, the second major surface supporting the second conductive coating and the second dielectric layer, and the first and second dielectric coatings may be farther from the at least one polymer substrate compared to the first and second conductive coatings.

In addition to the features of the previous paragraph, in certain example embodiments, first and second ink layers may be respectively supported by the first and second major surfaces of the at least one polymer substrate, the first and second ink layers being the outermost layers of the shutter.

In addition to the features of the previous paragraph, in certain example embodiments, the first ink layer may be the first dielectric layer and the second ink layer may be the second dielectric layer.

In addition to the features of any of the six previous paragraphs, in certain example embodiments, the first and second conductive layers each may comprise aluminum.

In addition to the features of any of the seven previous paragraphs, in certain example embodiments, the first conductive layer may be thinner than the second conductive layer.

In addition to the features of any of the eight previous paragraphs, in certain example embodiments, the at least one polymer substrate may include first and second polymer substrates, the first polymer substrate supporting the first conductive layer and the first dielectric layer on opposite major surfaces thereof, the second polymer substrate supporting the second conductive layer and the second dielectric layer on opposite major surfaces thereof. For instance, in certain example embodiments, the first and second polymer substrates are connected to one another with the first and second conductive coatings facing each other. Alternatively, in addition to the features of any of the eight previous paragraphs, in certain example embodiments, the at least one polymer substrate may include first and second polymer substrates, the first polymer substrate supporting the first conductive layer and the first dielectric layer, the second polymer substrate supporting the second conductive layer and the second dielectric layer. For instance, the first and second polymer substrates may be adjacent to one another such that the first and second conductive layers face away from each other, and/or the first and second dielectric layers may be provided over the first and second conductive layers, respectively, such that the first and second dielectric layers face away from each other.

In addition to the features of the previous paragraph, in certain example embodiments, the first and second polymer substrates may be connected to one another via a pressure sensitive adhesive.

In addition to the features of either of the two previous paragraphs, in certain example embodiments, first and second ink layers may be respectively supported by the first and second major surfaces of the at least one polymer substrate, e.g., with the first and second ink layers being the outermost layers of the shutter.

In addition to the features of the previous paragraph, in certain example embodiments, the first ink layer may be the first dielectric layer and the second ink layer may be the second dielectric layer.

In addition to the features of any of the 12 previous paragraphs, in certain example embodiments, the first and second conductive coatings may be the same material and have substantially the same thicknesses.

In addition to the features of any of the 13 previous paragraphs, in certain example embodiments, circuitry may include at least first and second independently controllable voltage sources. For instance, the second voltage source may be structured, in operation, to generate an electric field between the first and second conductive layers in creating the second electrostatic forces. Alternatively, in addition to the features of any of the 13 previous paragraphs, in certain example embodiments, circuitry may include three electrodes forming a three-phase bridge. For instance, the circuitry may include three individually connected inductors in series with each bridge output.

In certain example embodiments, there is provided a substrate, comprising a dynamically controllable shade provided thereon. The shade includes: a first conductive layer provided, directly or indirectly, on a major surface of the substrate; and a shutter including at least one polymer substrate, first and second conductive coatings, and first and second dielectric layers, wherein the at least one polymer substrate is extendible to a shutter closed position and retractable to a shutter open position. The first and/or second conductive coatings are electrically connectable to a power source that is controllable to set up (a) a first electric potential difference to create first electrostatic forces to drive the at least one polymer substrate to the shutter closed position, and (b) a second electric potential difference to create second electrostatic forces to encourage the at least one polymer substrate to at least partially retract.

In addition to the features of the previous paragraph, in certain example embodiments, the at least one polymer substrate may include first and second major surfaces, the first major surface supporting the first conductive coating and the first dielectric layer, the second major surface supporting the second conductive coating and the second dielectric layer. The first and second dielectric coatings may be farther from the at least one polymer substrate compared to the first and second conductive coatings.

In addition to the features of either of the two previous paragraphs, in certain example embodiments, the at least one polymer substrate may include first and second polymer substrates, the first polymer substrate supporting the first conductive layer and the first dielectric layer on opposite major surfaces thereof, the second polymer substrate supporting the second conductive layer and the second dielectric layer on opposite major surfaces thereof.

In certain example embodiments, a method of making an insulating glass (IG) unit is provided. The method includes having first and second substrates, each having interior and exterior major surfaces, the interior major surface of the first substrate facing the interior major surface of the second substrate. A dynamically controllable shade is provided on the first and/or second substrate, the shade including: a first conductive layer provided, directly or indirectly, on the interior major surface of the first substrate; and a shutter including at least one polymer substrate, first and second conductive coatings, and first and second dielectric layers, wherein the at least one polymer substrate is extendible to a shutter closed position and retractable to a shutter open position. The first and second substrates are connected to one another in substantially parallel, spaced apart relation, such that a gap is defined therebetween and such that the dynamically controllable shade is located in the gap. The first and/or second conductive coatings are electrically connectable to a power source that is controllable to set up (a) a first electric potential difference to create first electrostatic forces to drive the at least one polymer substrate to the shutter closed position, and (b) a second electric potential difference to create second electrostatic forces to encourage the at least one polymer substrate to at least partially retract.

In addition to the features of the previous paragraph, in certain example embodiments, circuitry includes at least first and second independently controllable voltage sources, e.g., with the second voltage source being structured, in operation, to generate an electric field between the first and second conductive layers in creating the second electrostatic forces.

In addition to the features of the previous paragraph, in certain example embodiments, circuitry includes three electrodes forming a three-phase bridge, e.g., with the circuitry being usable to drive the shutter between extended and retracted positions.

In addition to the features of either of the two previous paragraphs, in certain example embodiments, the at least one polymer substrate may include first and second major surfaces, the first major surface supporting the first conductive coating and the first dielectric layer, the second major surface supporting the second conductive coating and the second dielectric layer, wherein the first and second dielectric coatings are farther from the at least one polymer substrate compared to the first and second conductive coatings.

In addition to the features of any of the three previous paragraphs, in certain example embodiments, the at least one polymer substrate may include first and second polymer substrates, the first polymer substrate supporting the first conductive layer and the first dielectric layer on opposite major surfaces thereof, the second polymer substrate supporting the second conductive layer and the second dielectric layer on opposite major surfaces thereof.

While the invention has been described in connection with what is presently considered to be the most practical and preferred embodiment, it is to be understood that the invention is not to be limited to the disclosed embodiment and/or deposition techniques, but on the contrary, is intended to cover various modifications and equivalent arrangements included within the spirit and scope of the appended claims.

What is claimed is:

1. An insulating glass (IG) unit, comprising:
   first and second substrates, each having interior and exterior major surfaces, the interior major surface of the first substrate facing the interior major surface of the second substrate;
   a spacer system helping to maintain the first and second substrates in substantially parallel spaced apart relation to one another and to define a gap therebetween; and
   a dynamically controllable shade interposed between the first and second substrates, the shade including:
      a first conductive layer provided, directly or indirectly, on the interior major surface of the first substrate; and
      a shutter including at least one polymer substrate, first and second conductive coatings, and first and second dielectric layers, wherein the at least one polymer substrate is extendible to a shutter closed position and retractable to a shutter open position;
   wherein the first and/or second conductive coatings are electrically connectable to a power source that is controllable to set up (a) a first electric potential difference to create first electrostatic forces to drive the at least one polymer substrate to the shutter closed position, and (b) a second electric potential difference to create second electrostatic forces to encourage the at least one polymer substrate to at least partially retract.

2. The IG unit of claim 1, further comprising a dielectric or insulator film provided, directly or indirectly, on the first conductive layer, the dielectric or insulator film being separate from the shutter.

3. The IG unit of claim 1, wherein the shutter further supports a dielectric or insulator film thereon such that, when the at least one polymer substrate is in the shutter closed position and the shutter is extended, the dielectric or insulator film directly physically contacts the first conductive layer with no other layers therebetween.

4. The IG unit of claim 1, wherein the first conductive layer and the first and second conductive coatings collectively form first and second conductor pairs, the first conductor pair being a glass-to-shutter conductor pair formed by the first conductive layer and one or both of the first and second conductive coatings, the second conductor pair being a shutter-to-shutter conductor pair formed by the first and second conductive coatings but not the first conductive layer.

5. The IG unit of claim 1, wherein the at least one polymer substrate includes first and second major surfaces, the first major surface supporting the first conductive coating and the first dielectric layer, the second major surface supporting the second conductive coating and the second dielectric layer, wherein the first and second dielectric coatings are farther from the at least one polymer substrate compared to the first and second conductive coatings.

6. The IG unit of claim 5, further comprising first and second ink layers respectively supported by the first and second major surfaces of the at least one polymer substrate, the first and second ink layers being the outermost layers of the shutter.

7. The IG unit of claim 6, wherein the first ink layer is the first dielectric layer and the second ink layer is the second dielectric layer.

8. The IG unit of claim 5, wherein the first and second conductive coatings each comprise aluminum.

9. The IG unit of claim 5, wherein the first conductive coating is thinner than the second conductive coating.

10. The IG unit of claim 1, wherein the at least one polymer substrate includes first and second polymer substrates, the first polymer substrate supporting the first conductive coating and the first dielectric layer on opposite major surfaces thereof, the second polymer substrate supporting the second conductive coating and the second dielectric layer on opposite major surfaces thereof.

11. The IG unit of claim 10, wherein the first and second polymer substrates are connected to one another with the first and second conductive coatings facing each other.

12. The IG unit of claim 11, wherein the first and second polymer substrates are connected to one another via a pressure sensitive adhesive.

13. The IG unit of claim 10, further comprising first and second ink layers respectively supported by the first and second major surfaces of the at least one polymer substrate, the first and second ink layers being the outermost layers of the shutter.

14. The IG unit of claim 13, wherein the first ink layer is the first dielectric layer and the second ink layer is the second dielectric layer.

15. The IG unit of claim 10, wherein the first and second conductive coatings are the same material and have substantially the same thicknesses.

16. The IG unit of claim 1, further comprising circuitry including at least first and second independently controllable voltage sources.

17. The IG unit of claim 16, wherein the second voltage source is structured, in operation, to generate an electric field between the first and second conductive coatings in creating the second electrostatic forces.

18. The IG unit of claim 1, further comprising circuitry including three electrodes forming a three-phase bridge.

19. The IG unit of claim 18, wherein circuitry further includes three individually connected inductors in series with each bridge output.

20. The IG unit of claim 1, wherein the at least one polymer substrate includes first and second polymer substrates, the first polymer substrate supporting the first conductive coating and the first dielectric layer, the second polymer substrate supporting the second conductive coating and the second dielectric layer.

21. The IG unit of claim 20, wherein the first and second polymer substrates are adjacent to one another such that the first and second conductive coatings face away from each other.

22. The IG unit of claim 20, wherein the first and second dielectric layers are provided over the first and second conductive coatings, respectively, such that the first and second dielectric layers face away from each other.

23. An article, comprising:
a substrate comprising a first conductive surface; and
a shutter, wherein the shutter comprises a second conductive surface,
wherein the shutter is extendible towards a shutter closed position and retractable towards a shutter open position, and
wherein the first conductive surface is electrically connectable to a power source that is controllable to set up (a) a first electric potential difference to create first electrostatic forces such that the shutter extends towards a closed position, and (b) a second electric potential difference to create second electrostatic forces such that the shutter at least partially retracts, wherein the first and second electric potential differences are different from one another.

24. The article of claim 23, wherein the shutter comprises at least one polymer substrate, the at least one polymer substrate including first and second major surfaces, the first major surface supporting the second conductive surface and a first dielectric surface, the second major surface supporting a third conductive surface and a second dielectric surface, wherein the first and second dielectric surfaces are farther from the at least one polymer substrate compared to the second and third conductive surfaces.

25. The substrate of claim 23, wherein the at least one polymer substrate includes first and second polymer substrates, the first polymer substrate supporting the first conductive layer and the first dielectric layer on opposite major surfaces thereof, the second polymer substrate supporting the second conductive layer and the second dielectric layer on opposite major surfaces thereof.

26. A method of making an insulating glass (IG) unit, the method comprising:
having first and second substrates, each having interior and exterior major surfaces, the interior major surface of the first substrate facing the interior major surface of the second substrate;
providing a dynamically controllable shade on the first and/or second substrate, the shade including:
a first conductive layer provided, directly or indirectly, on the interior major surface of the first substrate; and
a shutter including at least one polymer substrate, first and second conductive coatings, and first and second dielectric layers, wherein the at least one polymer substrate is extendible to a shutter closed position and retractable to a shutter open position;
connecting the first and second substrates to one another in substantially parallel, spaced apart relation, such that a gap is defined therebetween and such that the dynamically controllable shade is located in the gap;
wherein the first and/or second conductive coatings are electrically connectable to a power source that is controllable to set up (a) a first electric potential difference to create first electrostatic forces to drive the at least one polymer substrate to the shutter closed position, and (b) a second electric potential difference to create second electrostatic forces to encourage the at least one polymer substrate to at least partially retract.

27. The method of claim 26, further comprising providing circuitry including at least first and second independently controllable voltage sources, wherein the second voltage source is structured, in operation, to generate an electric field between the first and second conductive coatings in creating the second electrostatic forces.

28. The method of claim 26, further comprising providing circuitry including three electrodes forming a three-phase bridge, the circuitry being usable to drive the shutter between extended and retracted positions.

29. The method of claim 26, wherein the at least one polymer substrate includes first and second major surfaces, the first major surface supporting the first conductive coating and the first dielectric layer, the second major surface supporting the second conductive coating and the second dielectric layer, wherein the first and second dielectric coatings are farther from the at least one polymer substrate compared to the first and second conductive coatings.

30. The method of claim 26, wherein the at least one polymer substrate includes first and second polymer substrates, the first polymer substrate supporting the first conductive coating and the first dielectric layer on opposite major surfaces thereof, the second polymer substrate supporting the second conductive coating and the second dielectric layer on opposite major surfaces thereof.

31. A method of operating a dynamic shade in an insulating glass (IG) unit, the method comprising:
having an IG unit made in accordance with the method of claim 26; and
selectively activating the power source to move the polymer substrate between the shutter open and closed positions,
wherein the first and second electric potential differences are different from one another.

* * * * *